United States Patent
Usui et al.

(10) Patent No.: US 8,319,848 B2
(45) Date of Patent: Nov. 27, 2012

(54) IMAGING APPARATUS

(75) Inventors: Tsutomu Usui, Yokohama (JP);
Haruhiko Higuchi, Fujisawa (JP);
Haruhiko Miyao, Mito (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 280 days.

(21) Appl. No.: 12/621,321

(22) Filed: Nov. 18, 2009

(65) Prior Publication Data

US 2010/0214429 A1 Aug. 26, 2010

(30) Foreign Application Priority Data

Feb. 26, 2009 (JP) .................................. 2009-043330

(51) Int. Cl.
*H04N 5/235* (2006.01)
(52) U.S. Cl. .................. 348/221.1; 348/229.1; 348/362
(58) Field of Classification Search ............... 348/221.1, 348/229.1, 362–364
See application file for complete search history.

(56) References Cited

U.S. PATENT DOCUMENTS

2007/0196097 A1* 8/2007 Sugimoto ..................... 396/234
2011/0274363 A1* 11/2011 Kawada ........................ 382/224

FOREIGN PATENT DOCUMENTS

JP 2007-180892 7/2007

* cited by examiner

*Primary Examiner* — Anthony J Daniels
(74) *Attorney, Agent, or Firm* — Kilpatrick Townsend & Stockton LLP (57) ABSTRACT

An imaging apparatus includes an imaging unit that receives image data in response to a photographic subject, a face detection unit that detects a human face from the received image data, a photometry unit that performs a photometry of the detected human face, an exposure control unit that calculates a target exposure amount in accordance with a photometry result to calculate an exposure control value, and an exposure correction control unit that determines an exposure in response to the target exposure amount, wherein an exposure correction unit performs an exposure correction by using an exposure target determined by the exposure correction control unit, as an area smaller than a domain of the human face detected by the face detection unit is set to the photometry area.

5 Claims, 6 Drawing Sheets

IMAGING APPARATUS

INCORPORATION BY REFERENCE

The present application claims priority from Japanese application JP2009-043330 filed on Feb. 26, 2009, the content of which is hereby incorporated by reference into this application.

BACKGROUND OF THE INVENTION

The present invention relates to an imaging apparatus.

As a background art of this technical field, there has been proposed as JP-A-2007-180892. This document discloses that "A camera provides a face detection circuit, a gamma correction control unit, and an image signal processing circuit. The face detection circuit detects a face from a received image signal to calculate a luminance-variation evaluated value at a face domain containing the detected face. The gamma correction control unit determines a gradation characteristic on the basis of the luminance variation evaluated value calculated by the face detection circuit. The image signal processing circuit then performs a gamma correction for the received image signal on the basis of the gradation characteristic determined by the gamma correction control unit."

In these days, digital cameras used for both static and dynamic images have been widely used, so that anybody can obtain good images easily. Among the images, a most frequently imaged subject is human, therefore, the digital cameras with a face-recognition optimization function have become widespread in such a way that a human's face is recognized automatically to then optimize the setting of camera.

The above-mentioned face-recognition function incorporated into the camera collates a pattern stored in a memory of the camera in advance with an input image to then detect a domain (hereinafter, refer to "face domain") in which the face in a screen is present. Information present in the detected face domain includes a domain position, a photometry amount, colors, etc., and an appropriate processing is performed automatically on the basis of the above-mentioned information when imaging the detected face domain. Here, the appropriate processing includes the following steps: a processing is applied such that the face domain has an appropriate luminance; the face domain is focused in priority; a white balance is adjusted to such that the face domain becomes an appropriate color; and the setting of color signal is changed to such that a developing color of skin becomes good.

Here, the technique, which automatically corrects the face domain to the appropriate luminance, is high necessity degree for users, as pointed out the first appropriate processing. A condition, in which a luminance difference between a background and a human becomes large, occurs frequently, such as backlit condition when imaging a human. In such case, the image is profoundly affected by the luminance of background, therefore, the luminance for the human sometimes become inappropriate. A manual correction can be applied to obtaining an appropriate luminance, however, it is complicated to correct it manually. Therefore, the manual correction is difficult for average users.

In contrast, the technique, in which the face domain is corrected automatically to the appropriate luminance, includes a method of varying an exposure control (appropriate control for an iris portion, a shutter, an AGC circuit (Automatic Gain Control circuit)) in response to a target exposure amount calculated from a photometrical result of the face domain. However, an exposure control value is a value for uniformly varying the luminance of an entirely acquired image, therefore, the luminance of face domain becomes appropriate, but the luminance of background becomes inappropriate to sometimes emerge a white patch and a black deficiency.

The technique, which corrects automatically the face domain to the appropriate luminance and prevents the white patch and black deficiency of the background, includes a method of varying the exposure control in response to the target exposure amount calculated from the photometry amount of face domain.

The method, which performs the exposure control in response to the information of face domain detected by the face-recognition function, includes a technique for varying the gradation characteristic by the gamma correction control, as disclosed in the JP-A-2007-180892, for example. The gamma correction control is a technique for varying the gradation characteristic of an acquired image. The above-mentioned gradation characteristic is controlled appropriately to be compatible with the luminance of face domain and the gradation of background.

The JP-A-2007-180892 discloses a technique to calculate the luminance difference in the face domain to use the gradation characteristic in response to the calculated result, so that the appropriate luminance can be obtained even though the luminance difference is present in the face domain. However, there is no disclosure for a condition which does not become an optimal exposure by performing the correction including the exposure correction for the background etc. other than the face, for such cases where a detection frame is not present in the center of face in this method when the face is directed toward the left, right, upward, and downward directions, and a face detection frame is displaced from the face position when the face moves fast.

As described above, in the human imaging, it is necessary to optimally control the exposure correction control and set the exposure control in response to the acquired image, even though the human face is directed toward not only the front direction but also the upward, downward, left and right, and oblique directions.

Further, the JP-A-2007-180892 does not disclose the exposure correction for not only the case where the face is directed toward the upward, downward, left, right, and oblique directions but also the case where the face is obstructed by the photographic subject, such as hair etc. having a different luminance from that of skin of the face domain.

SUMMARY OF THE INVENTION

An object of the invention is to provide a high image quality imaging apparatus, more specifically, to provide an imaging apparatus capable of correcting the face domain to an appropriate luminance, even though the cases where the human face is directed toward not only the front direction but also oblique, upward and downward directions, and the human face is obstructed by the hair etc. to adversely affect on the luminance of face domain.

In the invention, the following described embodiments might solve the above-mentioned problems, but do not limit thereto.

According to an embodiment of the invention, an imaging apparatus includes an imaging unit that receives image data in response to a photographic subject, a face detection unit that detects a human face from received image data, a photometry unit that performs a photometry of the human face detected, as a photometry area, by the face detection unit, and an exposure control unit that calculates a target exposure amount in accordance with a photometry result of the human face obtained from the photometry unit to calculate an exposure control value in accordance with the calculated target exposure amount, wherein an exposure correction is applied to the received image by using the exposure control value determined by the exposure control unit, as an area smaller than a domain of the human face detected by the face detection unit is set to a photometry area.

According to the invention, it is possible to provide the high image quality imaging apparatus. That is, the exposure control value is set appropriately to be able to correct the face domain to an optimal luminance while the luminance of the face domain is corrected appropriately, even though the face is directed toward the left, right, upward and downward directions. In consequence, it is possible to provide a camera maintaining an optimal gradation characteristic for imaging scenes.

The other objects, features and advantages of the invention will become apparent from the following description of the embodiments of the invention taken in conjunction with the accompanying drawings.

DESCRIPTION OF THE EMBODIMENTS

Hereinafter, embodiments of the invention will be described with reference to the drawings.

<First Embodiment>

Figure 1:
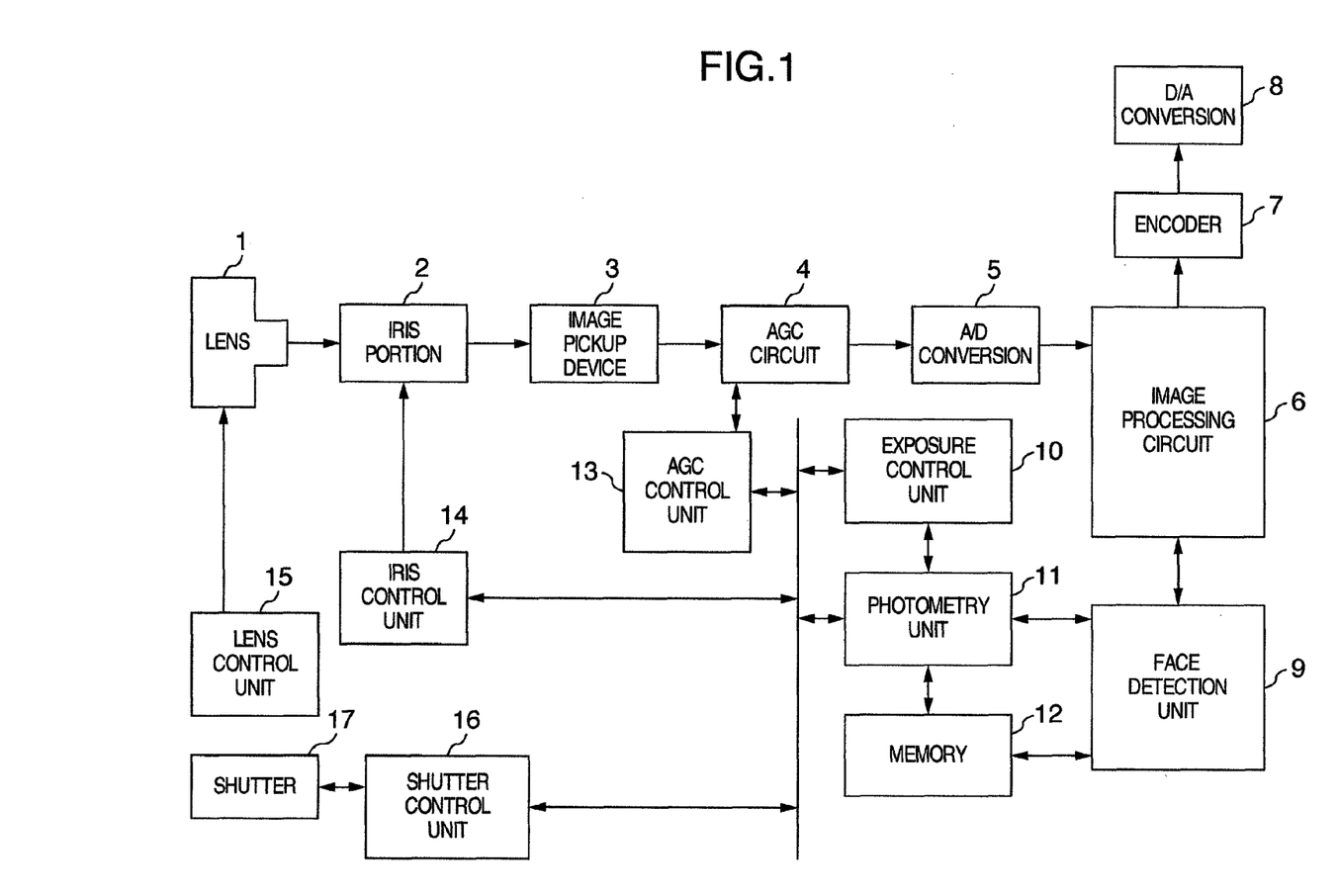
FIG. 1 is a block diagram showing a camera in a first embodiment of the invention.

FIG. 1 is a configuration diagram showing a camera in a first embodiment of the invention, in which a reference numeral 1 denotes a camera lens, 2 denotes an iris portion, 3 denotes an image pickup device, 4 denotes an AGC (Automatic Gain Control) circuit, 5 denotes an A/D conversion circuit, 6 denotes an image processing circuit, 7 denotes an encoder, 8 denotes a D/A conversion circuit, 9 denotes a face detection unit, 10 denotes an exposure control unit, 11 denotes a photometry unit, 12 denotes a memory, 13 denotes an AGO control unit, 14 denotes an iris control unit, 15 denotes a lens control unit, 16 denotes a shutter control unit, and 17 denotes a shutter.

Referring to FIG. 1, the shutter control unit 16 controls the shutter 17 when a shutter button on the camera is depressed. The camera lens 1 includes a focusing lens, a zoom lens, etc. to be controlled by the lens control unit 15. The iris portion 2 is controlled by the iris control unit 14 to adjust an incident light amount from the camera lens 1. The image pickup device 3 is of a CMOS image pickup device to convert, as a photoelectric conversion, a photographic subject image formed on an imaging surface by the camera lens 1 to then output an analog formed image signal (analog image signal). The AGO circuit 4 is controlled by the AGC control unit 13 to amplify the analog image signal to a predetermined signal level. The A/D conversion circuit 5 converts the analog image signal amplified in the AGC circuit 4 into a digital formed image signal (digital image signal). The image processing circuit 6 generates a digital luminance signal and a digital color signal from the digital image signal output from the A/D conversion circuit 5 to perform various signal processing, such as a gamma correction processing, an edge enhancement processing, a noise reduction processing, a white balance processing, etc. The encoder 7 generates a digital television signal pursuant to the standard television system, such as NTSC system, from the digital luminance signal and digital color signal output from the image processing circuit 6. The television signal is recorded or reproduced in or from a recording medium such as an optical disc (for example, BD (Blu-ray Disc) and DVD), a hard disc (HDD) and a semiconductor memory (built-in or removable type) by a record and reproduction circuit (not shown). The D/A conversion circuit 8 converts the digital television signal into the analog formed standard television signal.

The face detection unit 9 detects a face detected domain contained in the image signal output from the image pickup device 3 by the following sequence. First, the face detection unit 9 confirms whether parts of eyes, a mouth, eyebrows, a nose, etc. are present in respective these positions of the face detected domain on the basis of luminance information in the image signal entered into the image processing circuit 6. If the eyes, mouth, eyebrows, nose, etc. are present in the respective positions, a rectangular area enclosed that domain is detected as a face domain.

The photometry unit 11 performs a photometry for the image signal on the face domain detected by the face detection unit 9. The exposure control unit 12 calculates a target exposure amount on the basis of a photometry result performed for the image signal on the face domain to determine an exposure control value in response to the target exposure amount. Thereafter, the exposure control unit 12 controls the AGC control unit 13, iris control unit 14 and shutter control unit 16 in such a way that the digital image signal to be entered into the image processing circuit 6 becomes a value corresponding to the exposure control value.

Next, the following description will be concerned with an operation in the embodiment of the invention. Referring to FIG. 1, the camera lens 1 focuses the photographic subject image on the imaging surface of the image pickup device 3. The image pickup device 3 then converts, as a photoelectric conversion, an optical signal in response to the luminance of photographic subject image into an electric signal to then output as the analog image signal. This analog image signal is amplified to the predetermined signal level in the AGC circuit 4, and then converted into the digital image signal in the A/D conversion circuit 5 to be supplied to the image processing circuit 6.

At this time, the face detection unit 9 detects the face domain from the digital image signal entered into the image processing circuit 6 to perform an exposure control such that the face domain becomes an appropriate luminance. In response, the following description will be concerned with a photometry area setting method for the face domain.

FIGS. 2 to 5 are diagrams showing a relation between the exposure control and the photometry area in the first embodiment.

Figure 2:
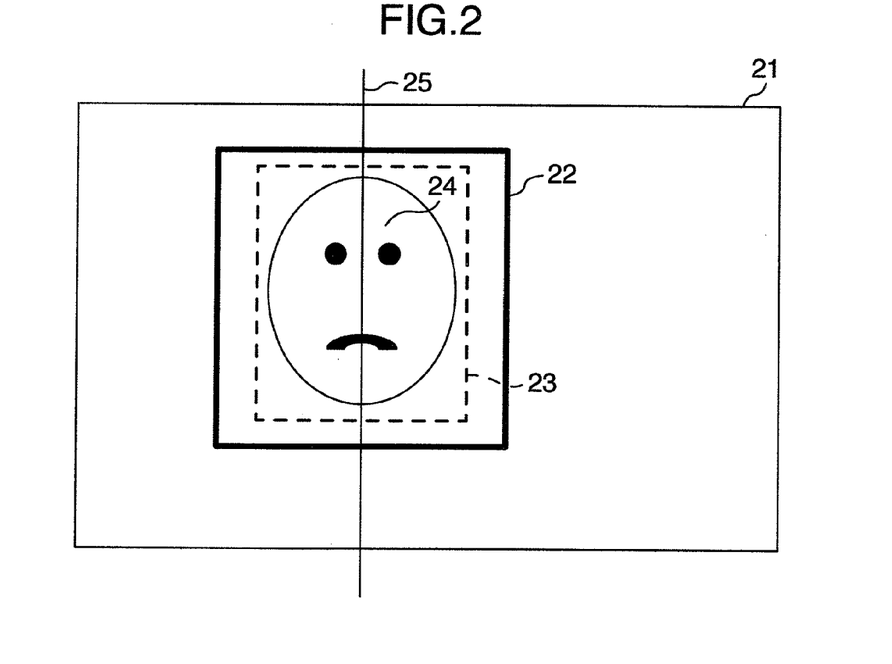
FIG. 2 is a diagram showing a relation between a face domain and a past photometry area in the first embodiment of the invention.

Referring to FIG. 2, a reference numeral 21 denotes an imaging area of the camera etc., 22 denotes a face detection frame, 23 denotes a photometry area, 24 denotes a face of a photographic subject, and 25 denotes a center line in a horizontal direction of the photometry area. The photometry area 23 and the center line of the face are illustrated in FIG. 2, however, other than the face detection frame 22 are normally not open to users.

Figure 3:
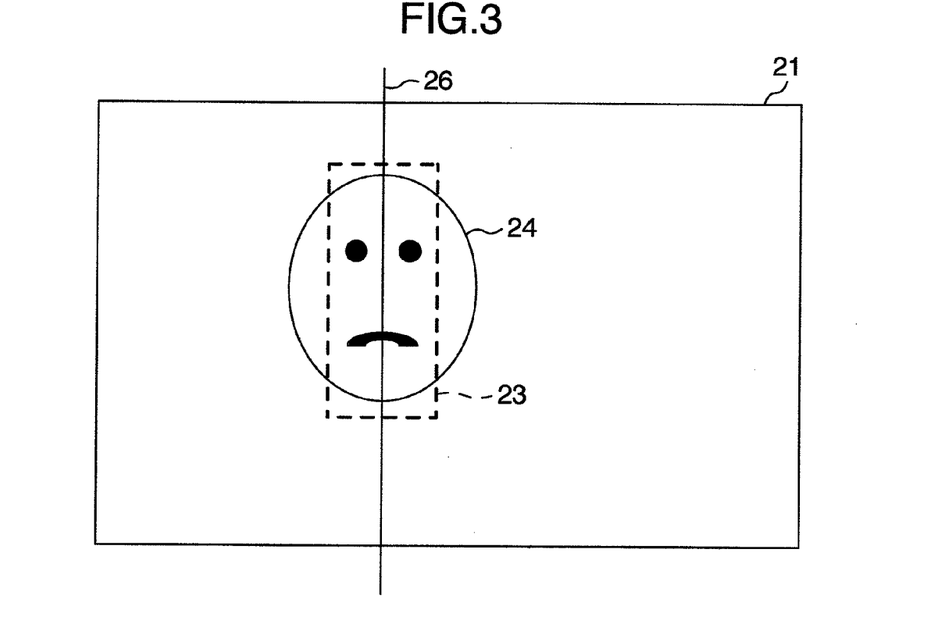
FIG. 3 is a diagram showing a relation between the face domain and a photometry area in the first embodiment of the invention.

FIG. 3 is similar to FIG. 2, in which a reference numeral 26 denotes a center line of the face of photographic subject, and other elements are appended with the same reference numerals as those shown in FIG. 2. The face detection frame 22 shown in FIG. 2 is omitted in FIG. 3.

Figure 4:
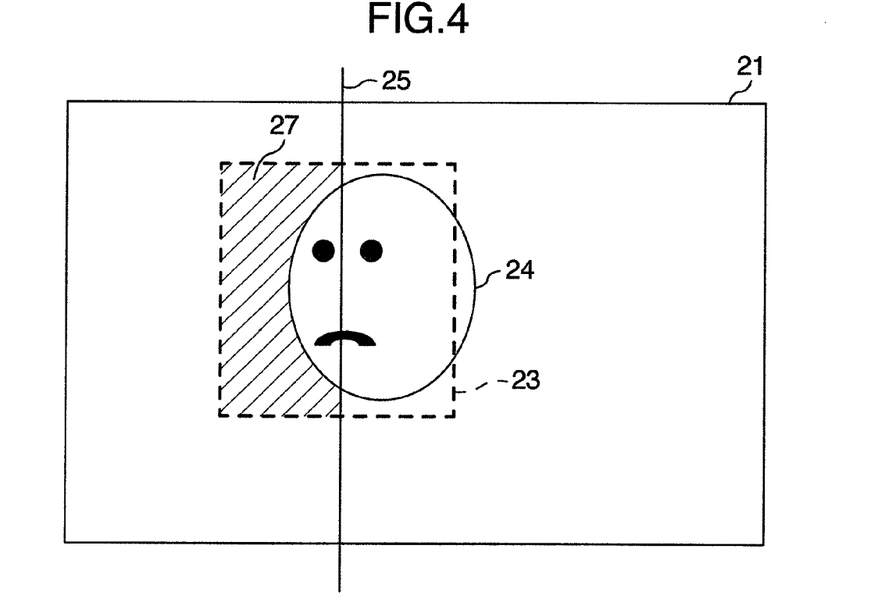
FIG. 4 is a diagram showing a relation between the face domain directed toward laterally and the past photometry area in the first embodiment of the invention.

FIG. 4 is also similar to FIG. 2, in which the numeral 24 has already denoted as the face of photographic subject but directed toward a horizontal direction, and a reference numeral 27 denotes a background portion etc. other than the face contained in the photometry area 23. The other elements are appended with the same reference numerals as those shown in FIG. 2.

Figure 5:
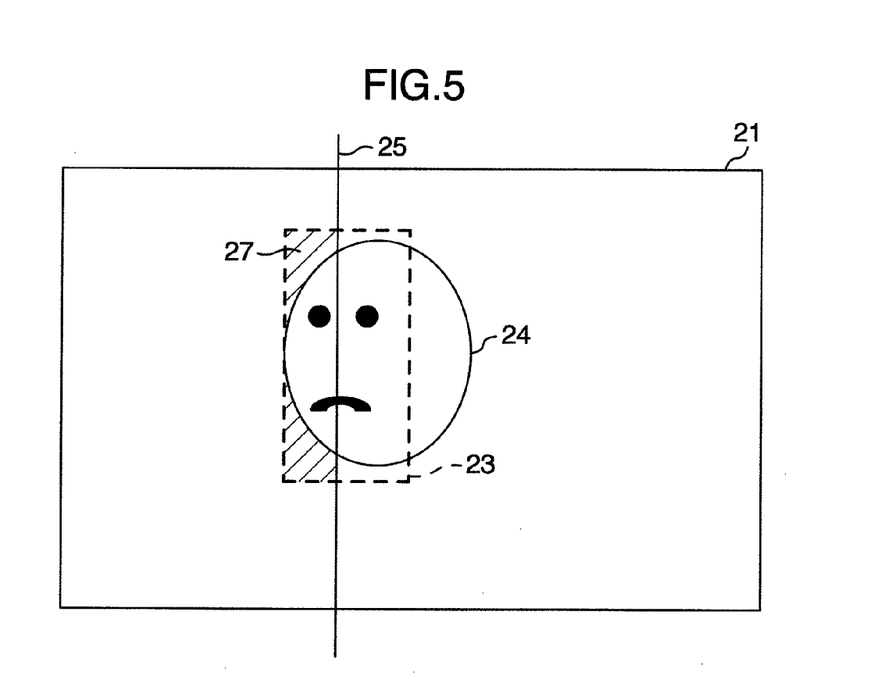
FIG. 5 is a diagram showing a relation between the face domain directed toward laterally and the photometry area in the first embodiment of the invention.

FIG. 5 is further similar to FIG. 4, in which the numeral 23 has already denoted as the photometry area scaled down in the horizontal direction, and other elements are appended with the same reference numerals as those shown in FIG. 4.

In the past control, the photometry area 23 has been controlled as the same size as the face shown in FIG. 2. However, the first embodiment has a feature setting the photometry area 23 to a size smaller than the face detection frame 22 as shown in FIG. 3, therefore, the size of the photometry area 23 is scaled down in the horizontal direction in comparison to the face detection frame 22 (FIG. 2) in FIG. 3. In this way, since the size of photometry area 23 is scaled down in the horizontal direction and a large portion of the photometry area 23 is so overlapped with the face domain of photographic subject, an optimal exposure control can be realized for the following scene rather than the past processing.

In the scene that can obtain the optimal exposure in this embodiment, for example, when the face of photographic subject changes to the horizontal direction, the center position of the photometry area 23 is displaced against an actual face position in the case where the photometry area 23 maintains a normal position as shown in FIG. 4. As a result, the background other than the face is contained in the photometry area 23, so that the optimal exposure control cannot be applied to the face of photographic subject.

Consequently, the photometry area 23 is scaled down in the horizontal direction in comparison to the face detection frame 22 as illustrated in FIG. 5, therefore, the luminance of the face domain can be made into the optimal condition even though the face is changed to the horizontal direction.

Further, for example, the photographic subject is sometimes controlled into rather bright than the optimal exposure when a hair having a relatively low luminance level is contained in the photometry area 23, other than a skin which is desirably and optimally exposed by maintaining a normal photometry area for the case of the photographic subject having the long hair, even though the face is directed toward the front. However, the photometry area 23 is scaled down in the horizontal direction, therefore, it is possible to perform the optimal exposure matched with the skin color portion of the face.

<Second Embodiment>

A second embodiment will be described for the photometry area 23 which is scaled down in the perpendicular direction to the face detection frame 22. The following description is concerned with a difference from the past photometry area.

Figure 6:
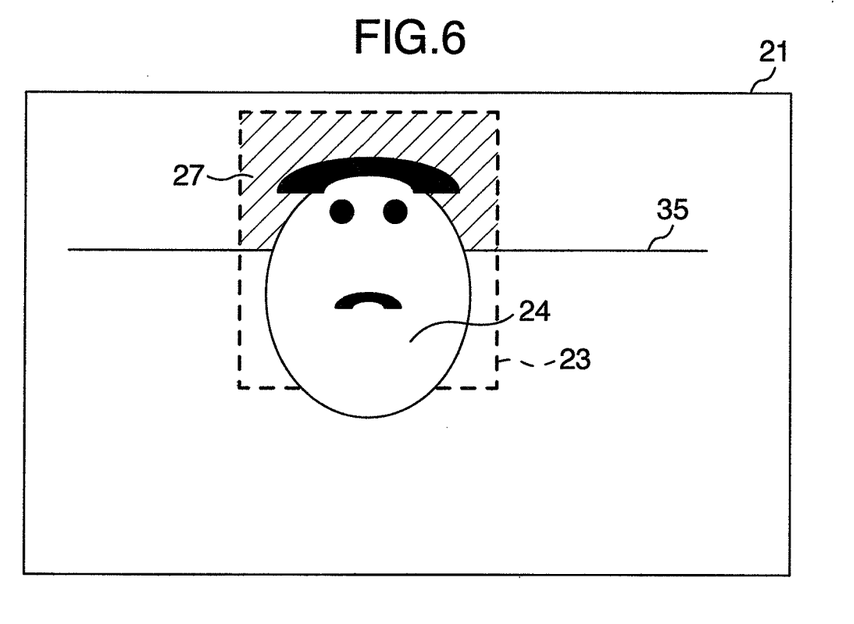
FIG. 6 is a diagram showing a relation between the face domain directed toward upwardly and the past photometry area in a second embodiment of the invention.

FIG. 6 is a diagram showing a relation between an upward face domain and a past photometry area in a second embodiment, in which the above-indicated numeral 23 denotes a past photometry area, the above-indicated numeral 24 denotes a face of photographic subject directed toward an upward direction, a numeral 35 denotes a center line in a perpendicular direction of the photometry area 23, and other elements are appended with the same reference numerals as those shown in FIG. 4.

Figure 7:
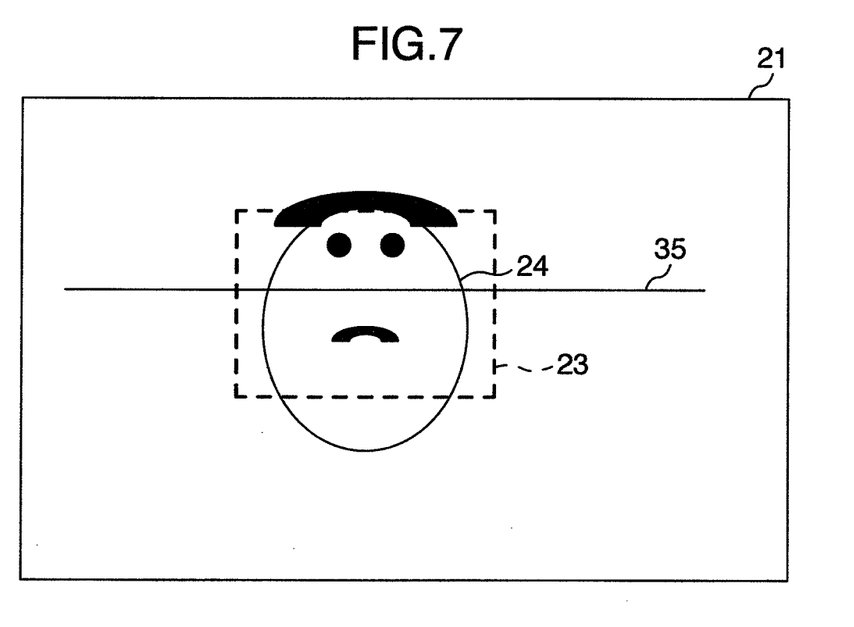
FIG. 7 is a diagram showing a relation between the face domain directed toward upwardly and the photometry area in the second embodiment of the invention.

FIG. 7 is a diagram showing a relation between the upward face domain and the photometry area 23, in which the above-indicated numeral 23 denotes a photometry area scaled down in the perpendicular direction, and other elements are appended with the same reference numerals as those shown in FIG. 6.

When the face of photographic subject is directed toward an upward direction as shown in FIG. 6, the past photometry area 23 is displaced to the upward direction against the face position. Therefore, the optimal exposure control has not been performed since the past photometry area 23 contains the background, hair, etc. more than the skin portion of the face that is exposed desirably and optimally. Consequently, the photometry area 23 is scaled down in the perpendicular direction in comparison to the face detection frame 22 (FIG. 2) as shown in FIG. 7. In this way, the optimal exposure matched with the face can be realized since the unnecessary background, hair, etc. are not contained in the photometry area 23, even in a condition where the face of photographic subject is directed toward upwardly. Likewise, the optimal exposure can, of course, be realized in a condition where the face of photographic subject is directed toward downwardly.

<Third Embodiment>

Figure 8:
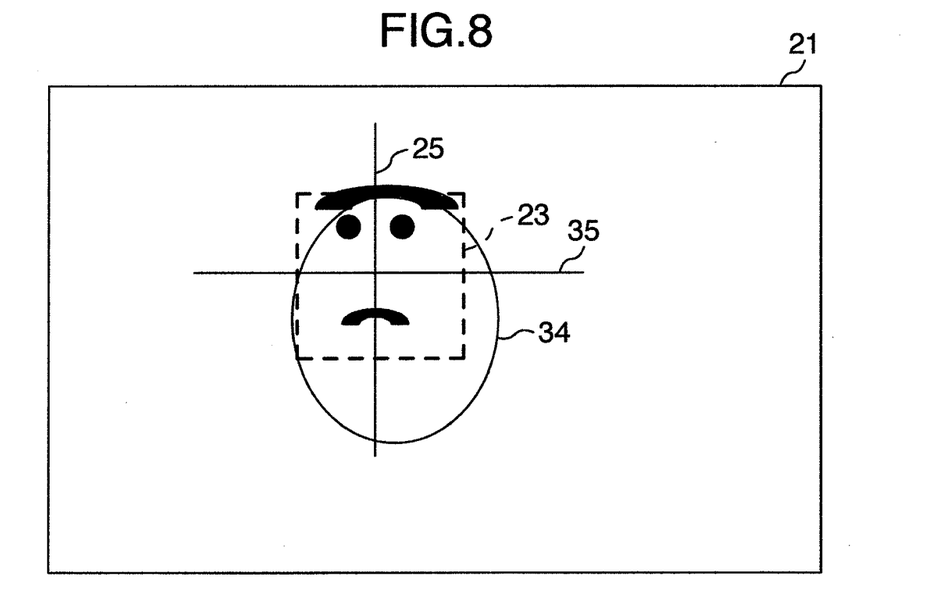
FIG. 8 is a diagram showing a relation between the face domain directed toward obliquely and the photometry area in a third embodiment of the invention.

A third embodiment will be described for the case where the face is directed toward the upward and downward directions while it is directed toward the horizontal direction. FIG. 8 is a diagram showing a relation between an oblique face domain and the photometry area 23 in the third embodiment, in which the above-indicated numeral 23 denotes a photometry area scaled down in the perpendicular and horizontal directions, and other elements are appended with the same reference numerals as those shown in FIGS. 5 and 6.

In this embodiment, a combination is made with the case where the above-mentioned face is inclined to the horizontal direction and is also directed laterally and the case where the face is inclined to the perpendicular direction and to the upward and downward directions so that the photometry area 23 is scaled down in the perpendicular and horizontal directions rather than the past size. It is therefore possible to remove the face domain, containing the background and hair, which is not the domain for the face skin, as shown in FIG. 8. It is thereby possible to perform the exposure control matched with the luminance of the face domain even though the face of photographic subject is directed toward the upward and downward directions while it is directed laterally.

<Fourth Embodiment>

In a fourth embodiment, when the face is directed toward the front, the size of photometry area 23 is set to that of the past one. However, when the direction of the face is changed to the upward, downward, left and right directions from the condition where the face is directed toward the front, an angle caused by moving the face is detected and the size of photometry area 23 is then varied in response to the angle. By controlling the size of photometry area 23 as described above, the photometry area 23 is set to the normal size to thereby perform the optimal exposure control by using the entire face when the face of photographic subject is directed toward the front. When the face of photographic subject is directed toward the upward and downward directions, the size of photometry area 23 is varied in accordance with the face angle to remove a factor other than the face with the background and hair to be able to perform the optimal exposure control.

Figure 9:
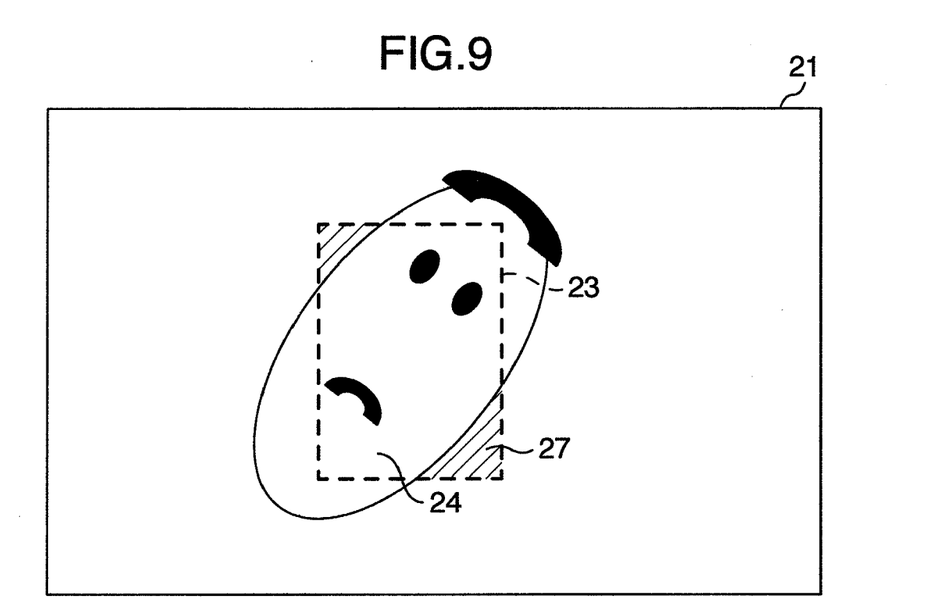
FIG. 9 is a diagram showing a relation between the face domain inclined and the past photometry area in a fourth embodiment of the invention.

FIG. 9 is a diagram showing a relation between an inclined face domain and the past photometry area in the fourth embodiment, in which the above-indicated numeral 24 denotes a face of the inclined photographic subject, and other elements are appended with the same reference numerals as those shown in FIG. 6.

<Fifth Embodiment>

Figure 10:
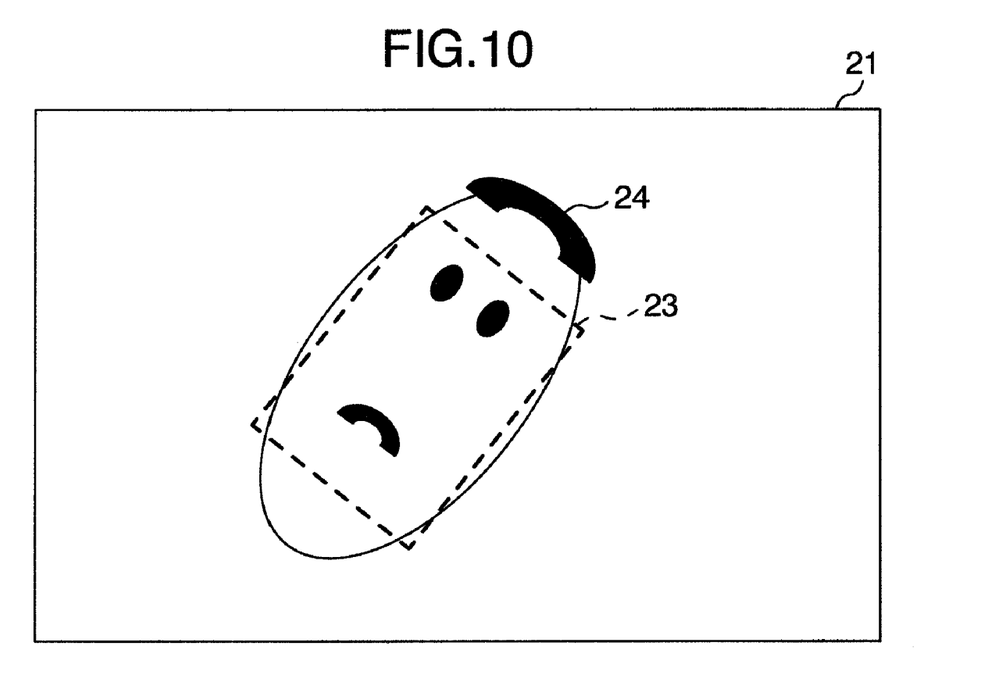
FIG. 10 is a diagram showing a relation between the face domain inclined and the photometry area in a fifth embodiment of the invention.

In a fifth embodiment, a description will be concerned with an example where the photometry area 23 is inclined similarly against the inclined face of photographic subject. FIG. 10 is a diagram showing a relation between the inclined face domain and the photometry area in the fifth embodiment, in which the above-indicated numeral 23 denotes a photometry area having an inclination matched with the face, and other elements are appended with the same reference numerals as those shown in FIG. 9.

When the direction of face is oblique as shown in FIG. 9, the exposure control cannot sometimes be performed appropriately since the face is not overlapped on the photometry area 23, caused by the oblique face, to thereby contain the background in the photometry area 23, in the case of the normal photometry area 23. Likewise, the exposure control cannot sometimes be performed appropriately since a black photographic subject, which is not present in the photometry area 23, increases more in the case of the photographic subject having a long hair. Consequently, as shown in FIG. 10, the angle of the face of photographic subject is detected to rotate the photometry area 23 so as to match with the face angle, so that it is possible to perform the exposure control appropriately since the background is not contained in the photometry area 23 of the face of photographic subject and an adverse affect of the hair etc. can be reduced.

Further, the above-mentioned embodiments have described for the exposure correction control for varying the photometry area, however, the photometry area may be used for a purpose of an automatic focus. The face has been detected in the case of the above-mentioned embodiments, however, a specific photographic subject other than the face is also applicable by using the same configuration and operation as described in the above-mentioned embodiments. In this case, a technique can be used for detecting various specific photographic subjects, but its detailed description is omitted here.

In here, this invention is not limited to above-mentioned embodiments but also includes various modifications. For example, the above-mentioned embodiments are explained in details for clarity, and not necessarily limited to including all the explained structure. Furthermore, it is possible for adding, deleting or substituting other alternative structure in place of a part of the structure of the embodiment.

Further, a part of the configuration or entire thereof described in the above-mentioned embodiments may be configured by hardware, or realized by software to be executed in a processor. A control line and information line have been described as be necessary for the explanation of the invention, however, all of the control and information lines have not necessarily been described. Practically, almost all configurations may be interconnected.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An imaging apparatus including an exposure control unit for applying an exposure correction to a received image, comprising:
    an imaging unit that receives image data in response to a photographic subject;
    a face detection unit that detects a human face from the received image data;
    a photometry unit that performs a photometry of the human face detected, as a photometry area, by the face detection unit; and
    the exposure control unit that calculates a target exposure amount in accordance with a photometry result of the human face obtained from the photometry unit to calculate an exposure control value in accordance with the calculated target exposure amount, wherein
    the exposure control unit applies an exposure correction to the received image by using the exposure control value determined by the exposure control unit, as an area smaller than a domain of the human face detected by the face detection unit is set to a photometry area, wherein an inclination of the detected human face is determined, and a shape of the photometry area is varied by inclining the photometry area in response to an inclination degree of the human face.

2. The apparatus according to claim 1 wherein the photometry area of the human face is set to a size smaller than the domain of the human face detected in a horizontal direction in comparison to the domain of human face detected by the face detection unit.

3. The apparatus according to claim 1 wherein the photometry area of the human face is set to a size smaller than the domain of the human face detected in a perpendicular direction in comparison to the domain of the human face detected by the face detection unit.

4. The apparatus according to claim 1 wherein the photometry area of the human face is set to a size smaller than the domain of the human face detected in the horizontal direction and the perpendicular direction in comparison to the domain of the human face detected by the face detection unit.

5. The apparatus according to claim 4 wherein a direction of the detected human face is determined, the size in the horizontal direction of the photometry area is varied against an inclination in the horizontal direction of the human face, and the size of the photometry area is varied by varying the size in the perpendicular direction of the photometry area in response to the inclination of the perpendicular direction of the human face.

* * * * *